Patented Aug. 5, 1941

2,251,394

UNITED STATES PATENT OFFICE 2,251,394

SOFTENED RUBBER

Warren F. Busse, Akron, and Edward N. Cunningham, Cuyahoga Falls, Ohio, assignors to The B. F. Goodrich Company, New York, N. Y., a corporation of New York No Drawing. Application May 11, 1938, Serial No. 207,327

4 Claims. (Cl. 260—761)

This invention relates to the art of rubber manufacture and has for its object the rapid softening of crude rubber to a plastic, readily soluble condition suitable for further manufacturing operations.

A number of chemical agents for accelerating what is frequently called the breakdown of rubber—that is, its transformation from a tough resilient mass to a soft plastic mass—have been proposed recently. Nevertheless the improvement effected by such chemical agents in the way of power saving and reduced time are so small in most instances that most of the rubber now used is still broken down in the conventional way by mechanical treatment without the addition of any chemical agent.

This invention is based on the discovery that the breakdown of rubber is greatly accelerated by treating it at elevated temperatures with an aromatic thioether. This is most readily accomplished by subjecting the rubber together with the added thioether to mastication of such intensity that heat of internal friction brings about the desired rise in temperature; but this action can be supplemented or superseded by external heating if desired.

The thioethers of this invention include primarily the simple diarylsulfides such as diphenylsulfide, phenyl tolyl sulfide, phenyl xylyl sulfide, phenyl cumyl sulfide, phenyl xenyl sulfide, phenyl naphthyl sulfide, phenyl indanyl sulfide, phenyl anthracyl sulfide, diphenylsulfide, ditolylsulfide, dixenylsulfide, dinaphthylsulfide and the like. Diethers such as bis-phenylthio benzene (C$_6$H$_5$S.C$_6$H$_4$.SC$_6$H$_5$)

bis-tolylthio benzene, bis-naphthylthio benzene, bis-naphthylthio naphthalene, thianthrene which has the structural formula

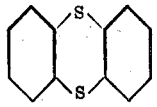

dimethyl thianthrene, tetramethyl thianthrene, dinaphththianthrene and the like are also extremely effective. These compounds can all be obtained at a very low cost. Compounds in which the sulfur is united to carbon which in turn is united to an element other than carbon by a double bond are not ordinarily considered to be ethers and are not included in the scope of this invention These thioethers have little effect at low temperatures, but at temperatures in the neighborhood of 170° F. have an appreciable effect and at 300° F. accelerate the breakdown of rubber very greatly. Proportions of from .05% to 5% may be used, but .5% is usually sufficient to bring about a marked acceleration in breakdown. The thioether may be distributed through the rubber by a preliminary mixing operation, or may be simply dusted on the surface of the rubber or sprinkled or sprayed on it together with a volatile solvent or non-volatile diluent or even alone if it is liquid. The rubber is then heated to the desired temperature whereupon a rapid softening is effected. It is ordinarily preferred to carry out the treatment in the absence of vulcanizing agents such as sulfur, although the presence of some sulfur may not be objectionable in those instances in which the temperature and duration of the treatment are insufficient to institute vulcanization.

As a specific example of one embodiment of the invention, 700 g. batches of smoked sheet rubber were masticated in a small internal mixer, at a temperature of 320° F. After masticating for three minutes 3.5 g. of ditolylsulfide and of dimethyl thianthrene respectively were added to separate batches and mastication was continued for an additional twelve minutes. The plasticity of the batch containing ditolylsulfide was 69.8 at 158° F. (Goodrich plastometer), and of the batch containing thianthrene was 67.8 whereas a similar batch without added material had a final plasticity of only 42.4.

We claim:

1. The method of softening crude rubber which comprises heating rubber at at least about 170° F. with a small proportion of a thianthrene.

2. The method of softening crude rubber which comprises heating rubber at at least about 170° F. with a small proportion of dimethylthianthrene.

3. A plastic unvulcanized crude rubber which has been softened by heating at at least about 170° F. with a thianthrene.

4. A plastic unvulcanized crude rubber which has been softened by heating at at least about 170° F. with dimethylthianthrene.

WARREN F. BUSSE.
EDWARD N. CUNNINGHAM.